United States Patent
Ishii (10) Patent No.: US 8,902,447 B2
(45) Date of Patent: Dec. 2, 2014

(54) IMAGE PROCESSING APPARATUS DISPLAYING OPERATING PROCEDURE, CONTROL METHOD THEREFOR, AND STORAGE MEDIUM STORING CONTROL PROGRAM THEREFOR

(75) Inventor: Yoko Ishii, Kawasaki (JP)

(73) Assignee: Canon Kabushiki Kaisha (JP)

( * ) Notice: Subject to any disclaimer, the term of this patent is extended or adjusted under 35 U.S.C. 154(b) by 399 days.

(21) Appl. No.: 13/461,907

(22) Filed: May 2, 2012

(65) Prior Publication Data

US 2012/0287457 A1    Nov. 15, 2012

(30) Foreign Application Priority Data

May 9, 2011  (JP) .................................. 2011-104366

(51) Int. Cl.

| | | |
|---|---|---|
| G06K 15/00 | (2006.01) | |
| H04N 1/00 | (2006.01) | |
| G06F 3/048 | (2013.01) | |
| G06F 3/12 | (2006.01) | |
| G03G 15/00 | (2006.01) | |
| G06K 15/02 | (2006.01) | |
| G06K 1/00 | (2006.01) | |
| G06K 15/10 | (2006.01) | |

(52) U.S. Cl.
CPC ............ *G06K 15/02* (2013.01); *H04N 1/00076* (2013.01); *G06F 3/048* (2013.01); *H04N 1/0005* (2013.01); *G06F 3/1234* (2013.01); *H04N 1/00037* (2013.01); *G06F 3/121* (2013.01); *G03G 15/502* (2013.01); *H04N 1/00015* (2013.01)
USPC ............ 358/1.14; 358/1.5; 358/1.9; 358/1.12

(58) Field of Classification Search
None
See application file for complete search history.

(56) References Cited

U.S. PATENT DOCUMENTS 4,475,806 A    10/1984    Daughton et al.

FOREIGN PATENT DOCUMENTS

| JP | 59-78372 A | 5/1984 |
|---|---|---|
| JP | 08-069223 A | 3/1996 |

*Primary Examiner* — Thierry L Pham
(74) *Attorney, Agent, or Firm* — Rossi, Kimms & McDowell LLP (57) ABSTRACT

An image processing apparatus that is capable of displaying a user's operating procedure to a user appropriately. A first acquisition unit acquires, when a detection unit detects an error, operating procedure data that shows a user's operation required to release the errors and an operating position at which the user's operation is performed corresponding to the detected error. A second acquisition unit acquires, when a user position differs from the operating position acquired by the first acquisition unit, applicable movement data that urges a user to move to the operating position from the user position. A display unit displays, when the second acquisition unit acquires the movement data, the operating procedure data acquired by the first acquisition unit after displaying the movement data, and displays, when the second acquisition unit does not acquire the movement data, the operating procedure data acquired by the first acquisition unit.

7 Claims, 10 Drawing Sheets

IMAGE PROCESSING APPARATUS DISPLAYING OPERATING PROCEDURE, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus that can display an operating procedure, a control method therefor, and a storage medium storing a control program therefor.

2. Description of the Related Art

Conventionally, an image forming apparatus that urges a user to operate by displaying an operating procedure or a conceptual diagram of the apparatus on a display unit of an operation unit as an illustration or a message in order to guide an error release procedure (release of jam, supply of toner, or the like) when an error (a jam, an out-of-toner error, or the like) occurs has been suggested (for example, see Japanese Laid-Open Patent Publication (Kokai) No. S59-078372 (JP S59-078372A)).

An operation guidance using an animation is also proposed in Japanese Laid-Open Patent Publication (Kokai) No. H8-69223 (JP H8-69223A), for example. Since this enables to describe a complicated operation and to display a detailed operation in an operation point, a user can operate easily.

However, the instruction only with an illustration or a message as proposed in JP S59-078372A is too poor for a user who is unfamiliar to an operation of the apparatus to operate easily, when a complicated operation is needed in order to release a jam.

Although the instruction with an animation as proposed in JP H8-69223A can display operation guidance for a jam occurrence point, it is difficult to grasp a position that should be operated in the whole apparatus. When instructing continuous operations particularly, it becomes difficult to tell a user a change of operation position.

SUMMARY OF THE INVENTION

The present invention provides an image processing apparatus, a control method therefor, and a storage medium storing a control program therefor, which are capable of displaying a user's operating procedure to a user appropriately.

Accordingly, a first aspect of the present invention provides an image processing apparatus comprising a holding unit configured to hold a user position indicating a position of a user with respect to the image processing apparatus, a plurality of detection units configured to detect a plurality of errors that may occur in the image processing apparatus, respectively, an operating procedure data storing unit configured to store operating procedure data that shows user's operations required to release the respective errors, and operating positions at which the respective user's operations are performed, a movement data storing unit configured to store movement data that urges a user to move to an operating position from the user position, a first acquisition unit configured to acquire, when at least one of the detection units detects an error, operating procedure data and an operating position corresponding to the detected error from the operating procedure data storing unit, a second acquisition unit configured to acquire, when the user position held by the holding unit differs from the operating position acquired by the first acquisition unit, applicable movement data from the movement data storing unit, and a display unit configured to display, when the second acquisition unit acquires the movement data, the operating procedure data acquired by the first acquisition unit after displaying the movement data, and to display, when the second acquisition unit does not acquire the movement data, the operating procedure data acquired by the first acquisition unit.

Accordingly, a second aspect of the present invention provides a control method for an image processing apparatus comprising a holding step of holding a user position indicating a position of a user with respect to the image processing apparatus, a detection step of detecting an error that may occur in the image processing apparatus, a first acquisition step of acquiring operating procedure data that shows a user's operation required to release the error and an operating position at which the user's operation is performed from an operating procedure data storing unit when the error is detected in the detection step, a second acquisition step of acquiring movement data that urges a user to move to an operating position from the user position from a movement data storing unit when the user position held in the holding step differs from the operating position acquired in the first acquisition step, and a display step of displaying, when the movement data is acquired in the second acquisition step, the operating procedure data acquired in the first acquisition step after displaying the movement data, and of displaying, when the movement data is not acquired in the second acquisition step, the operating procedure data acquired in the first acquisition step.

Accordingly, a third aspect of the present invention provides a non-transitory computer-readable storage medium storing a control program causing a computer to execute the control method according to the second aspect.

According to the present invention, the image processing apparatus, the control method therefor, and the storage medium storing the control program therefor, which are capable of displaying a user's operating procedure to a user appropriately, can be provided.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
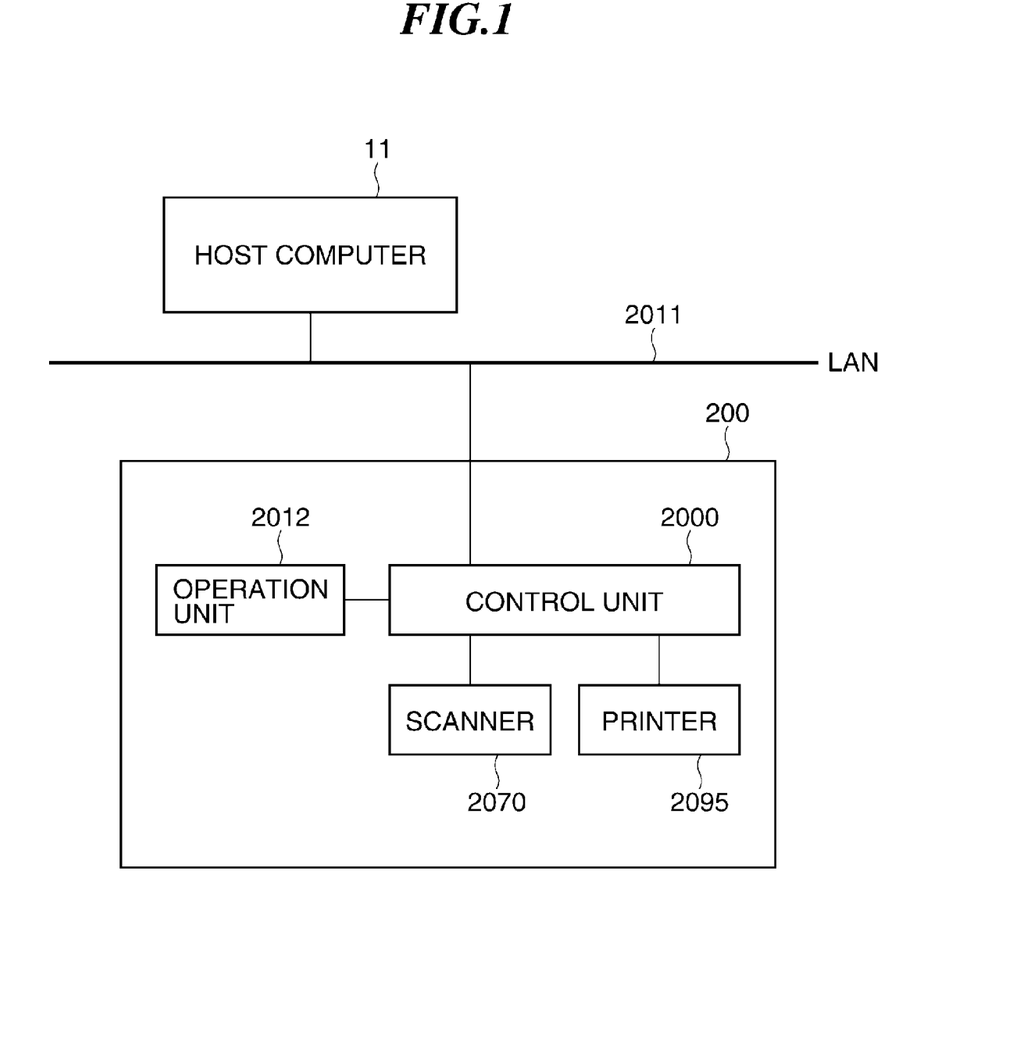
FIG. 1 is a view showing a schematic configuration of a network system including an image processing apparatus according to a first embodiment of the present invention.

FIG. 1 is a view schematically showing a configuration of an image forming apparatus 200 according to a first embodiment of the present invention.

In FIG. 1, the image processing apparatus 200 is connected with a host computer 11 via a LAN 2011 as a network, and is also able to process an image according to an instruction from the host computer 11. This embodiment is applicable to any apparatus as long as the apparatus can process an image and has a display function.

In FIG. 1, the image processing apparatus 200 consists of a scanner 2070 that is an image input device, a printer 2095 that is an image output device, a control unit 2000, and an operation unit 2012 that is a user interface.

The scanner 2070, the printer 2095, and the operation unit 2012 are connected to the control unit 2000, respectively. The control unit 2000 is connected to the LAN 2011. The operation unit 2012 receives a command input from a user, notifies the user of a state of the image processing apparatus 200, and displays a variety of information. Therefore, the operation unit 2012 corresponds to a display unit that displays information to the user.

The host computer 11 is an information processing apparatus that functions as a client machine, and includes a display unit, a keyboard, a pointing device, and a main unit of the computer. The host computer 11 has a function to load an operating system onto a RAM from a storage unit contained in the main unit and to execute various kinds of application programs including a Web browser. The host computer 11 can communicate with the image processing apparatus 200 that performs a Web server function process mentioned later via the LAN 2011 in a predetermined protocol, and the Web browser displays the information acquired by communication.

Figure 2:
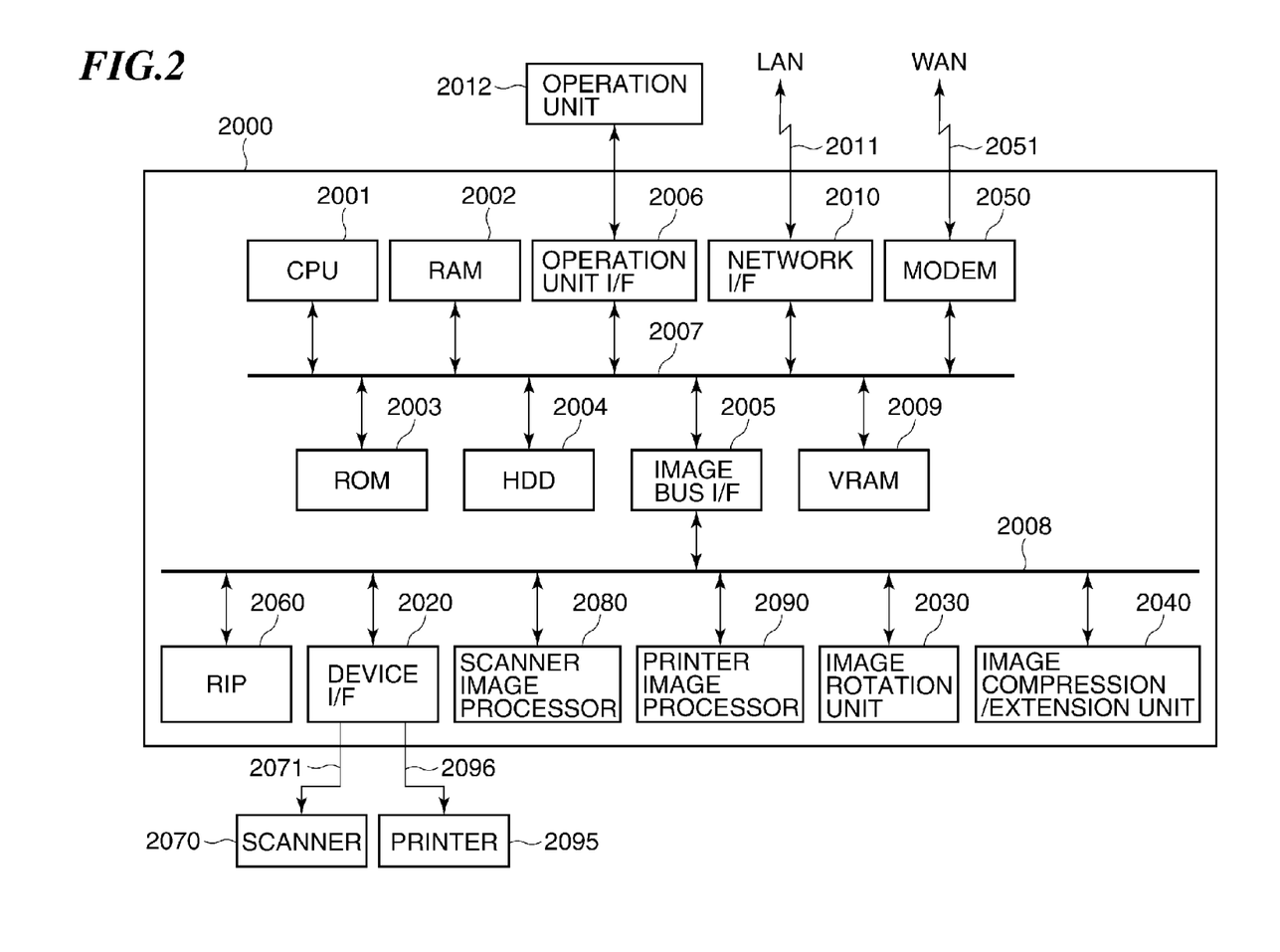
FIG. 2 is a block diagram schematically showing an electric configuration of a control unit shown in FIG. 1.

FIG. 2 is a block diagram schematically showing an electric configuration of the control unit 2000 shown in FIG. 1.

The CPU 2001 shown in FIG. 2 controls the whole system. A RAM 2002 is a system work memory for an operation of the CPU 2001, and is also an image memory for storing image data temporarily. A ROM 2003 functions as a boot ROM that stores a boot program of the system.

A hard disk drive (HDD) 2004 stores system software, image data, and display data. An operation unit I/F 2006 functions as an interface to an operation unit 2012, and outputs screen data that is displayed on the operation unit 2012 to the operation unit 2012. The operation unit I/F 2006 transfers information inputted by a user using the operation unit 2012 to the CPU 2001.

The CPU 2001 generates a screen using the display data acquired from the HDD 2004, and a VRAM 2009 saves the screen data that is displayed on the operation unit 2012.

A network I/F 2010 is connected to the LAN 2011, and inputs and outputs information. A modem 2050 is connected to a public line 2051, and inputs and outputs information.

An image bus I/F 2005 is a bus bridge that connects a system bus 2007 with an image bus 2008 that transmits image data at high speed, and that converts a data structure.

The image bus 2008 consists of a PCI bus or IEEE1394. An RIP (raster image processor) 2060 develops a PDL code to a bitmap image.

A device I/F 2020 connects the scanner 2070 connected via a scanner interface 2071 and the printer 2095 connected via a printer interface 2096 to the control unit 2000. The device I/F 2020 converts the image data between a synchronous system and an asynchronous system.

A scanner image processor 2080 corrects, processes, and edits inputted image data. A printer image processor 2090 corrects the image data that is outputted by the printer unit 20 and changes the resolution thereof.

An image rotation unit 2030 performs an image rotation process. An image compression/extension unit 2040 applies a compression/extension process in a JPEG format to multi-level image data, and applies a compression/extension process in a JBIG, MMR, or MH format to binary image data.

Figure 3:
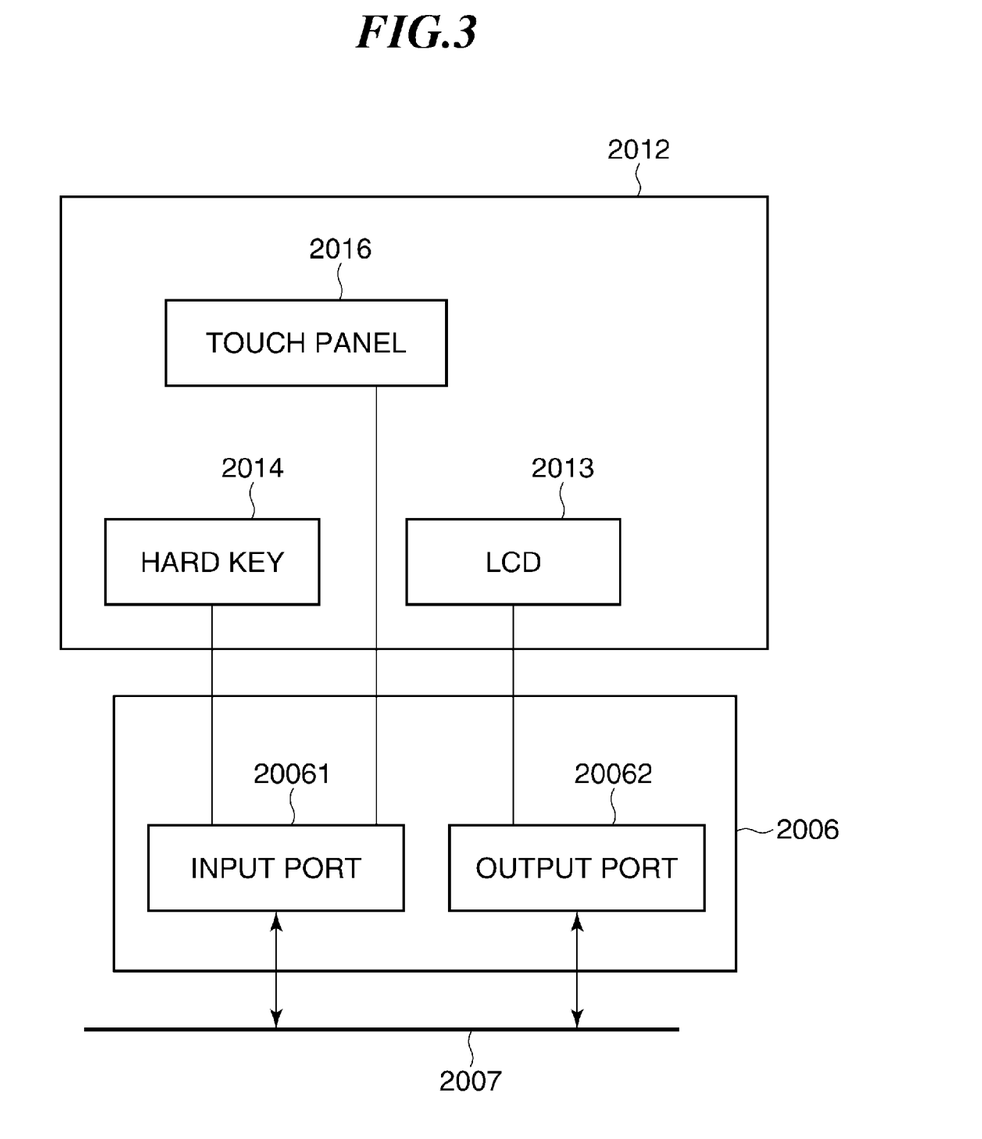
FIG. 3 is a view showing configurations of an operation unit and an operation unit I/F (interface) shown in FIG. 2.

FIG. 3 is a view showing configurations of the operation unit 2012 and the operation unit I/F 2006 shown in FIG. 2.

As shown in FIG. 3, the operation unit 2012 is provided with a touch panel 2016, a hard key 2014, and an LCD 2013. The operation unit I/F 2006 is provided with an input port 20061 and an output port 20062.

The touch panel 2016 is united with the LCD 2013, and recognizes a user's operation. The LCD 2013 displays a variety of information to a user. The hard key 2014 is operated by a user.

The operation unit I/F 2006 outputs the content inputted by the user via the touch panel 2016 and the hard key 2014 to the system bus 2007 via the input port 20061. Screen data generated by the CPU 2001 based on the acquired operation content and a program is held by the VRAM 2009. The screen data held by the VRAM 2009 is outputted to the LCD 2013 via the output port 20062.

Figure 4:
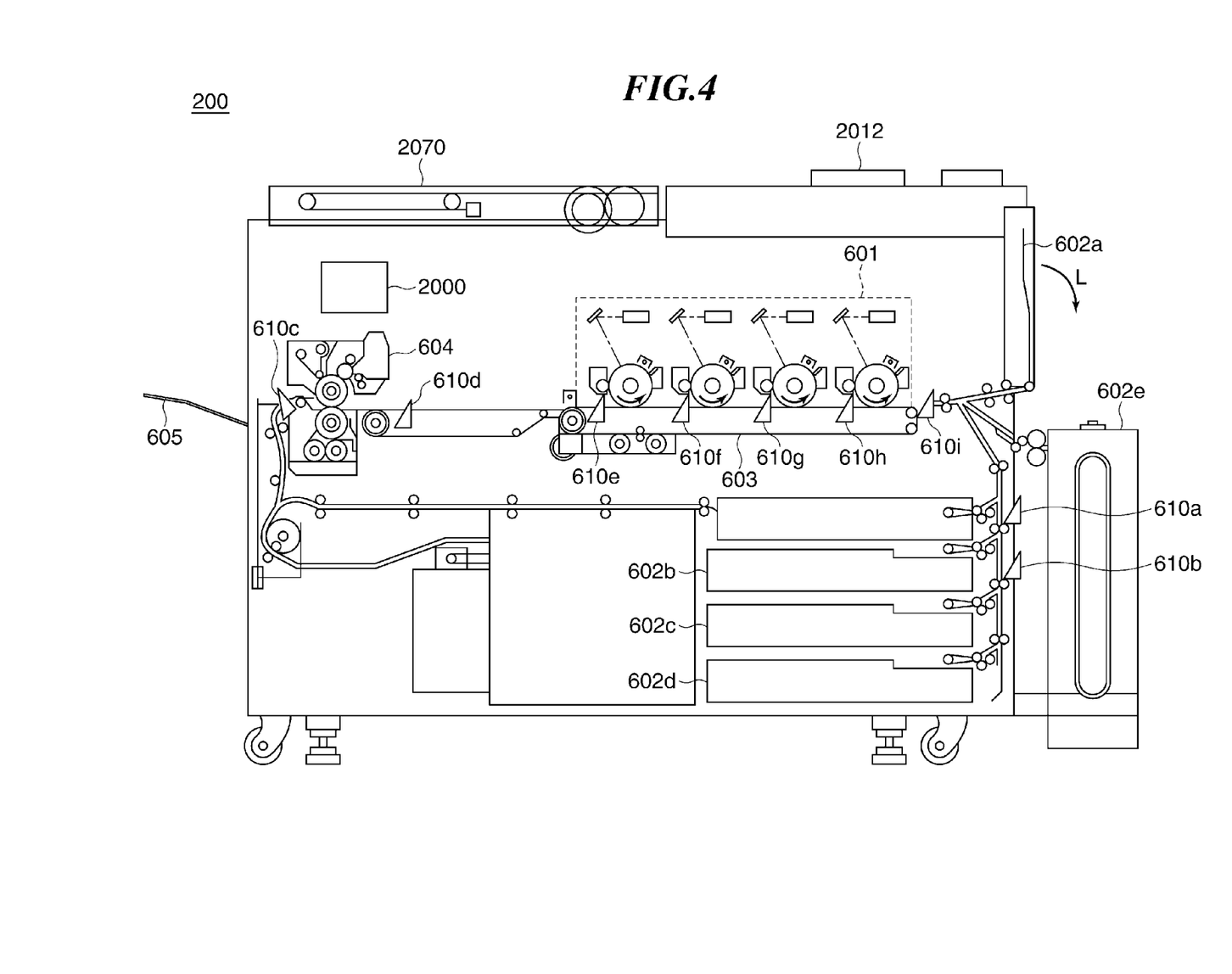
FIG. 4 is a view showing a mechanical configuration of the image processing apparatus shown in FIG. 1.

FIG. 4 is a view showing a mechanical configuration of the image processing apparatus 200 shown in FIG. 1.

As shown in FIG. 4, the image processing apparatus 200 includes an image forming unit 601, sheet feeding units 602a, 602b, 602c, 602d, and 602e, a transfer belt 603, a fixing unit 604, and an ejection unit 605.

The image processing apparatus 200 includes the control unit 2000, the scanner 2070, and the operation unit 2012 that are mentioned above. The image processing apparatus 200 further includes sensors 610a, 610b, 610c, 610d, 610e, 610f, 610g, 610h, and 610i for detecting the presence or absence of a recording sheet.

The sheet feeding unit 602a is a manual-bypass tray into which a recording sheet is insert when it is opened in the direction of an arrow L. The sheet feeding units 602b through 602e contain stacked recording sheets. A recording sheet contained in each of the sheet feeding units is picked up by a feed roller, and is supplied to the image forming unit 601.

The image forming unit 601 comprises four image forming stations that form magenta, cyan, yellow, and black toner images. The image forming stations form toner images with the respective toners, and transfer the toner images concerned sequentially to the recording sheet that is conveyed on the transfer belt 603. Then, the recording sheet is conveyed to the fixing unit 604. The toner images formed on the recording sheet are fused by the fixing unit 604, and are fixed to the recording sheet. When the toner images have been fixed, the recording sheet will be ejected to the ejection unit 605.

The scanner 2070 acquires four color image signals by optically scanning and reading an original placed on an original stand. The operation unit 2012 may report an occurrence of jam during image formation and output result information of the image formation.

The sensors 610a through 610i are arranged on a conveyance path to detect the presence or absence of a recording sheet. It should be noted that the sensors 610a through 610i may be sensors using mechanical flag or sensors using optical elements.

The positions of the sensors 610a through 610i shown in FIG. 4 are examples, and are not limited to the illustrated positions. For example, when detecting all the recording sheets that pile up in the image processing apparatus 200 at a jam occurrence time, the sensors are preferably arranged at processing positions of the image formation (for example, the paper feeding position, the image formation position, the fixing position, etc.) or at equal intervals on the conveyance path.

Figure 5:
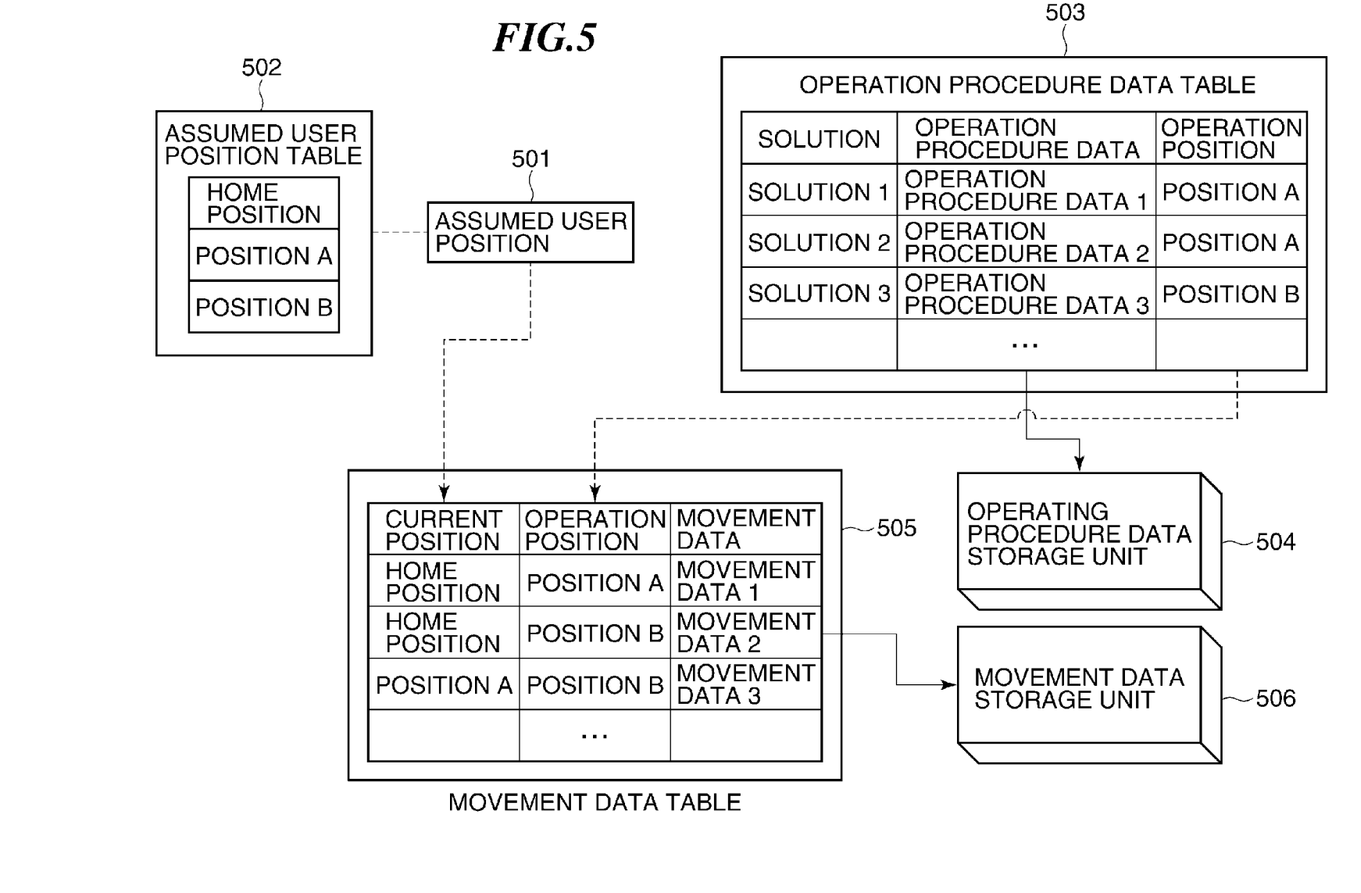
FIG. 5 is a view showing constructions of tables that are stored in an HDD and that hold movement data and operating procedure data that are displayed at a jam occurrence time of the image processing apparatus shown in FIG. 1.

FIG. 5 is a view showing constructions of tables that are stored in the HDD 2004 and that hold movement data and operating procedure data that are displayed at a jam occurrence time of the image processing apparatus shown in FIG. 1.

An assumed user position table 502 stores a home position, a position A, and a position B that have been defined beforehand. The assumed user position 501 at which the user is assumed to be operating is set from among the assumed user position table 502. This home position is what the user who operates the image processing apparatus 200 usually stands, and is the front of the image processing apparatus 200, for example.

An initial value of the assumed user position 501 is the home position, and the change of the user's position updates the set value. That is, the assumed user position 501 holds the position information that shows the user's position with respect to the image processing apparatus 200.

Each record of the operating procedure data table 503 is provided with a "solution" field, an "operating procedure data" field, and an "operating position" field. When detecting an occurrence of jam in the image processing apparatus 200, the CPU 2001 extracts the "operating procedure data" and the "operating position" corresponding to the "solution" for the point where a jam release operation is required with reference to the operating procedure data table. The operating procedure data table 503 is stored in an operating procedure data storing unit 504. The operating procedure data includes video data or a series of still image data and text data that show the procedure of operations that a user should perform (the procedure of releasing jam is shown in the case of the jam release operation). Therefore, the solution, the operating procedure data, and the operative position are associated with one another in the operating procedure data table 503, and the operating procedure data and the operating position shown in the operating procedure data table 503 are acquired according to the acquired state. When jams are detected at a plurality of points of the image processing apparatus 200, the operating procedure data and operative position corresponding to the solution with the highest priority high among the solutions corresponding to the jam positions are acquired.

Each record of a movement data table 505 is provided with a "current position" field, an "operating position" field, and a "movement data" field. When the assumed user position stored in the assumed user position 501 differs from the operating position acquired from the operating procedure data table 503, the CPU 2001 extracts the "movement data" corresponding to the current position that is equivalent to the assumed user position and the operating position with reference to the movement data table 505. The movement data table 505 is stored in a movement data storing unit 506. When the assumed user position stored in the assumed user position 501 is the same as the operating position acquired from the operating procedure data table 503, the CPU 2001 does not refer to the movement data table 505. The movement data includes video data or a series of still image data that notifies a user of the position to which the use should move, and text data.

Figure 6:
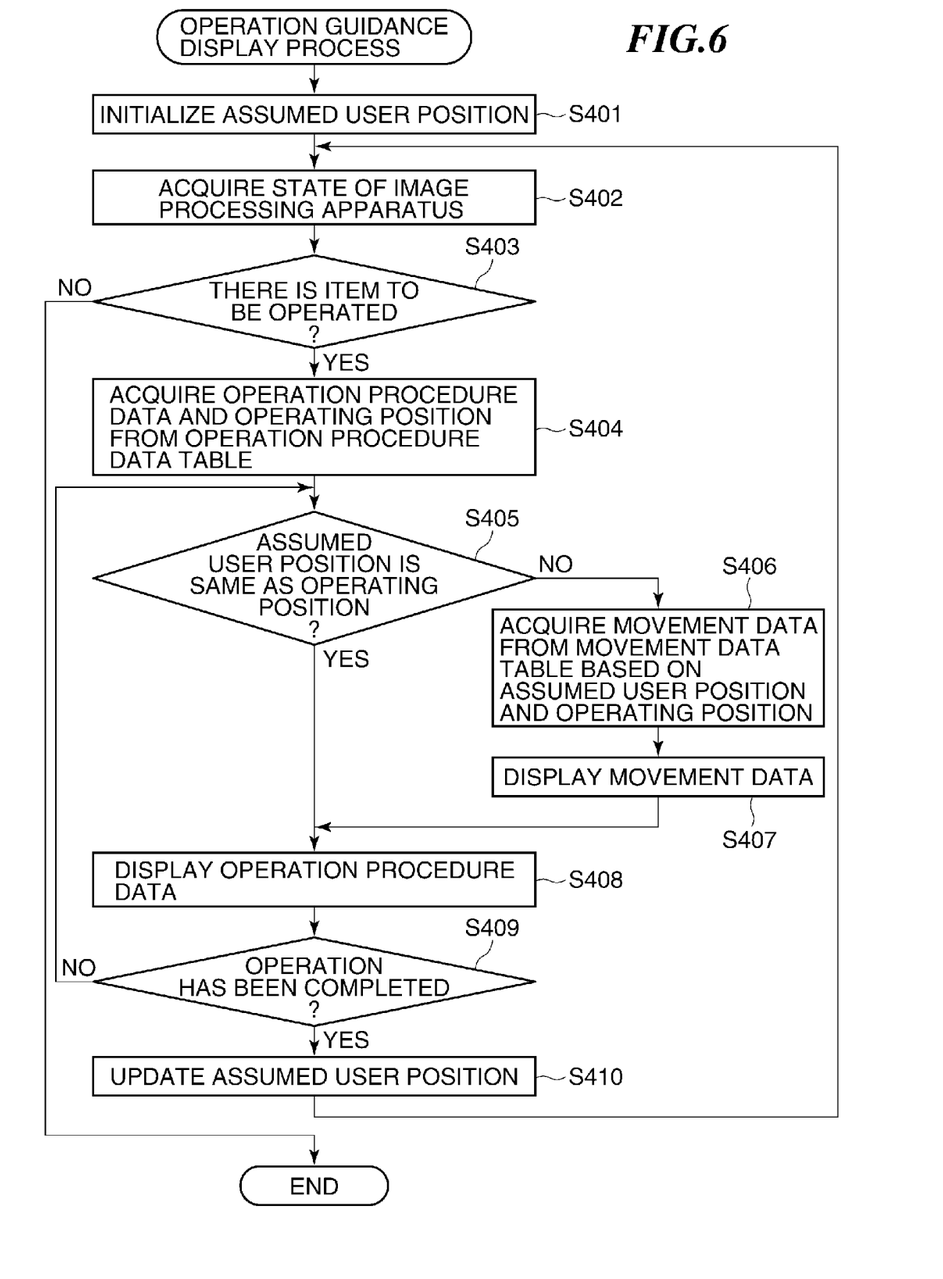
FIG. 6 is a flowchart showing a procedure of an operation guidance display process executed by a CPU shown in FIG. 2.

FIG. 6 is a flowchart showing a procedure of an operation guidance display process executed by the CPU 2001 shown in FIG. 2. Each step in FIG. 6 is executed by the CPU 2001 by developing the program stored in storage units such as the ROM 2003 to the RAM 2002.

This operation guidance display process starts at the timing when an occurrence of jam requires a solution.

As shown in FIG. 6, the CPU 2001 initializes the assumed user position, and sets this up as the home position (step S401). Next, the CPU 2001 acquires a state of the image processing apparatus 200 (step S402). Here, the state of the image processing apparatus 200 is acquired by detecting a jam occurrence point by the above-mentioned sensors 610a through 610i.

Next, the CPU 2001 determines whether there is an item that should be solved about the jam based on the state acquired in the step S402 (step S403). When there is no item that should be solved (NO in the step S403), the CPU 2001 terminates this process.

On the other hand, when there is an item that should be solved (YES in the step S403), the CPU 2001 acquires the operating procedure data and the operating position from the operating procedure data table 503 stored in the HDD 2004 according to the acquired jam occurrence point (step S404). That is, the operating procedure data showing the procedure that the user should operate and the position where the user operates are specified based on the state of the image processing apparatus 200.

Next, the CPU 2001 determines whether the assumed user position 501 set in the step S401 is the same as the operating position acquired in the step S404 (step S405).

When the assumed user position 501 is the same as the operating position (YES in the step S405), the CPU 2001 proceeds with the process to step S408.

On the other hand, when the assumed user position 501 differs from the operating position (NO in the step S405), the CPU 2001 acquires the movement data from the movement data table 505 stored in the HDD 2004 based on the assumed user position 501 and the operating position (step S406). The CPU 2001 displays the movement data acquired in the step S406 on the operation unit 2012 (step S407), and displays the operating procedure data on the operation unit 2012 (step S408). Thus, it is determined whether the assumed user position 501 is the same as the operating position specified in the step S404 in the step S405, and the movement data is displayed if needed based on the decision result in the step S405.

Next, the CPU 2001 determines whether the operation that the operating procedure data currently displays in the step S408 has been completed (step S409). When the operation has not been completed (NO in the step S409), the CPU 2001 returns the process to the step S405, and repeatedly displays the movement data and the operating procedure data according to the state.

On the other hand, when the operation has completed (YES in the step S409), the CPU 2001 updates the assumed user position with the operating position (step S410), and returns the process to the step S402.

Next, an example of the operating procedure according to the operation guidance display process mentioned above will be described.

The example assumes that an occurrence of jam was detected by the sensors 610a, 610b, and 610c of the image processing apparatus 200 shown in FIG. 4.

Then, operations of the solution 1 that releases the jam detected by the sensor 610a, the solution 2 that releases the jam detected by the sensor 610b, and the solution 3 that releases the jam detected by the sensor 610c are instructed.

Here, assuming that the solution 1 has the highest priority, the solution 2 has a second priority, and the solution 3 has a third priority.

The solution 1 and the solution 2 need the operation from the right side (referred to as the position A, hereafter) of the image processing apparatus 200, and the solution 3 needs the operation from the left side (referred to as the position B, hereafter).

First, the CPU 2001 initializes the assumed user position 501 with the home position in the step S401. Next, the CPU 2001 acquires the state of the image processing apparatus 200 by detecting the presence or absence of a jam based on the signals from the sensors 610a, 610b, and 610c in the step S402. The process of the steps S402 through S410 repeats until finishing the operation guidance for the solutions 1 through 3.

When instructing the solution 1, the CPU 2001 acquires the operating procedure data 1 as the "operating procedure data" and the position A as the "operating position" corresponding to the solution 1 with reference to the operating procedure data table 503 stored in the operating procedure data storing unit 504 in the step S404, The CPU 2001 determines whether the assumed user position is the same as the operating position in the step S405. Since the assumed user position 501 differs from the operating position at this time, the CPU 2001 proceeds with the process to the step S406. Then, the CPU 2001 acquires the movement data 1 from the movement data table 505 stored in the movement data storing unit 506, based on the home position as the "current position" corresponding to the assumed user position and the position A as the "operating position".

In the step S407, the CPU 2001 displays the movement data 1 acquired in the step S406 on the operation unit 2012. When the display of the movement data finishes, the CPU 2001 displays the operating procedure data 1 acquired in the step S404 to the operation unit 2012 in the next step S408.

In the step S409, the CPU 2001 determines whether the user completed the operation currently displayed on the operation unit 2012. When the operation has not completed, the CPU 2001 proceeds with the process to the step S405 and determines whether the assumed user position is the same as the operating position. Since the assumed user position is the home position and the operating position is the position A as mentioned above here, the process after the step S406 is repeated until the user completes the operation. Therefore, when it is determined that the operation has not completed, the movement data and the operating procedure data are displayed again.

When the user completes the operation, the CPU 2001 updates the assumed user position 501 from the home position to the position A at which the user currently operates in the step S410.

Next, the operation for the solution 2 is instructed. In the step S404, the CPU 2001 acquires the operating procedure data 2 as the "operating procedure data" and acquires the position A as the "operating position" from the operating procedure data table 503. In the step S405, since the assumed user position is the position A and the "operating position" is the position A, the CPU 2001 determines as YES. Therefore, the CPU 2001 proceeds with the process to the step S408 without referring to the movement data table 505, and displays only the operating procedure data 2 on the operation unit 2012.

When the operation for the solution 2 has been completed, the assumed user position is again updated to the position A, and the operation guidance for the solution 3 is instructed. Since the position A differs from the position B in the solution 3 in the step S405, the CPU 2001 acquires the movement data 3 from the movement data table 505 in the step S406, and displays the movement data 3 and the operating procedure data 3 onto the operation unit 2012 in order.

In this way, the process will be finished, when the user completes the operations by the solution 3 and all the jams are released.

According to the process in FIG. 6, the CPU 2001 sets the assumed user position with respect to the image processing apparatus 200 first (the step S401). Next, the CPU 2001 acquires the state of the image processing apparatus 200 (step S402). The CPU 2001 determines whether there is an item that should be solved based on the acquired state (the step S403). When determining that there is an item that should be solved (YES in the step S403), the CPU 2001 acquires the operating procedure data and the operating position for displaying them on the operation unit 2012 (step S404).

Next, the CPU 2001 determines whether the assumed user position is the same as the operating position acquired in the step S404 (the step S405). Then, when determining that the set-up assumed user position differs from the acquired operating position (NO in the step S405), the CPU 2001 acquires the movement data that urges the user to move to the acquired operating position (the step S406), and displays the acquired movement data onto the operation unit 2012 (the step S407).

Furthermore, the CPU 2001 displays the acquired operating procedure data onto the operation unit 2012 (the step S408). Then, the CPU 2001 determines whether the operation shown in the item which should be solved has been completed (the step S409). When determining that operation has been completed (YES in the step S409), the CPU 2001 updates the set-up assumed user position (the step S410).

Therefore, the process in FIG. 6 enables exactly to display the operating procedure that should be performed by the user to the user. When the user needs to move and operate at a plurality of operation points of the apparatus, the next operating point at which the user will operate can be instructed intelligibly to the user.

Although the above-mentioned example describes the case where the user operates according to the indication on the operation unit 2012, the next example will describe the operation guidance in the case where the user ignores the indication on the operation unit 2012 and operates from a point other than the point currently displayed. That is, the operation guidance in the case where the user operates at the operating points in the order different from the operating procedure determined by the apparatus when the user needs to operate at a plurality of points will be described.

When the user operates a point different from the point that is currently displayed on the operation unit 2012 in the steps S407 and S408, the CPU 2001 updates the assumed user position with the operating position corresponding to the solution that the user operated and solved in the step S410 after the operation is completed.

Next, the CPU 2001 acquires the state of the apparatus in the step S402 by detecting a jam occurrence point that has not been operated. Therefore, the operation guidance for the point that the user operated will not be displayed after that, but the operation guidance for releasing the jam occurred at the point other than the point that the user operated will be displayed. Accordingly, even if the user operates in the order different from the operating procedure that is determined by the apparatus, the order of the display is changed dynamically, which can guide the user to operate correctly.

FIG. 7A through FIG. 7D are views showing examples of images displayed on the operation unit 2012 in the operation guidance display process in FIG. 6.

Figure 7A:
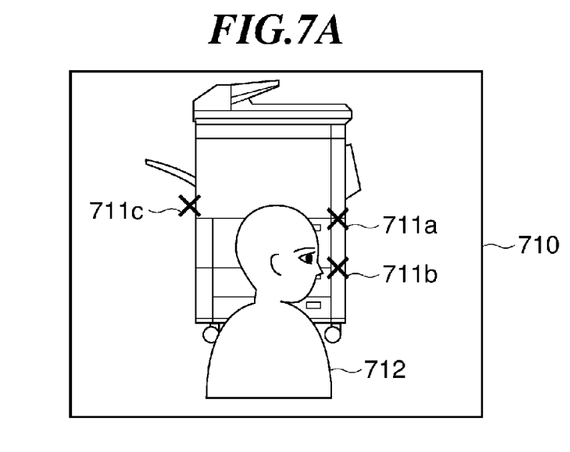
FIG. 7A through FIG. 7D are views showing examples of images displayed on an operation unit in the operation guidance display process in FIG. 6.
Figure 7B:
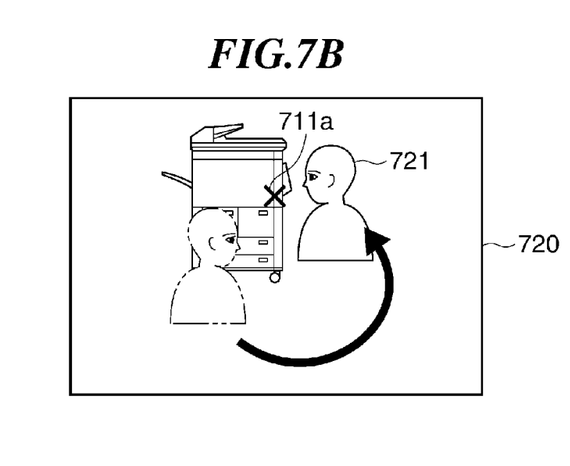
Figure 7C:
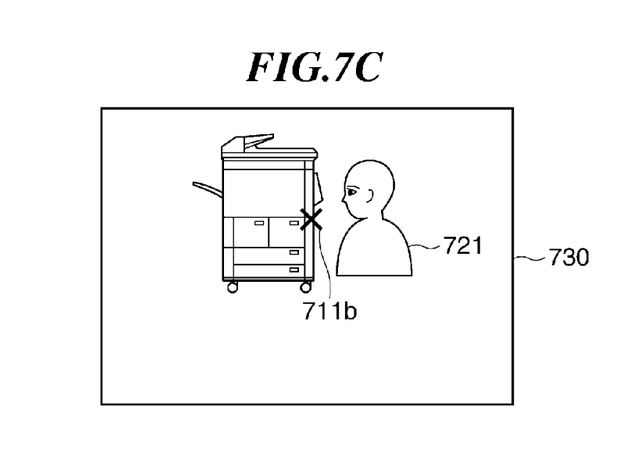
Figure 7D:
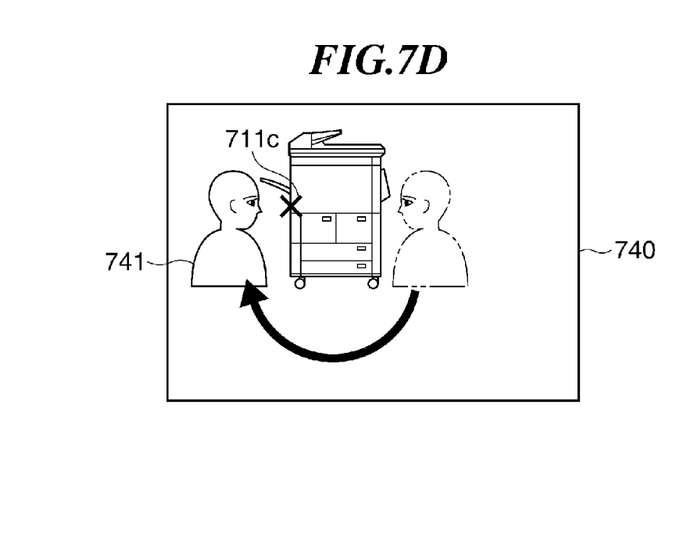

That is, FIG. 7A, through FIG. 7D are views showing examples of the images displayed on the operation unit 2012 when jams occur at certain points in the image processing apparatus 200. This example describes on the assumption that the jam occurrence points 711a, 711b, and 711c are operated in order.

An image 710 in FIG. 7A shows the jam occurrence points 711a, 711b, and 711c on the assumption that the assumed user position is the home position 712.

First, when operating the jam occurrence point 711a, the user needs to move to the operating position 721 shown in an image 720 in FIG. 7B from the home position 712. The continuous display of the image 710 and the image 720 becomes movement data that urges the user to move.

Next, since the user does not need to move when operating the jam occurrence point 711b after operating the jam occurrence point 711a, no movement data is displayed as shown in an image 730 in FIG. 7C.

When operating the jam occurrence point 711c after operating the jam occurrence point 711c, the user needs to move to the operating position 741 shown in an image 740 in FIG. 7D from the operating position 721 shown in the image 730. Therefore, the continuous display of the image 730 and the image 740 becomes movement data that urges the user to move.

Figure 8:
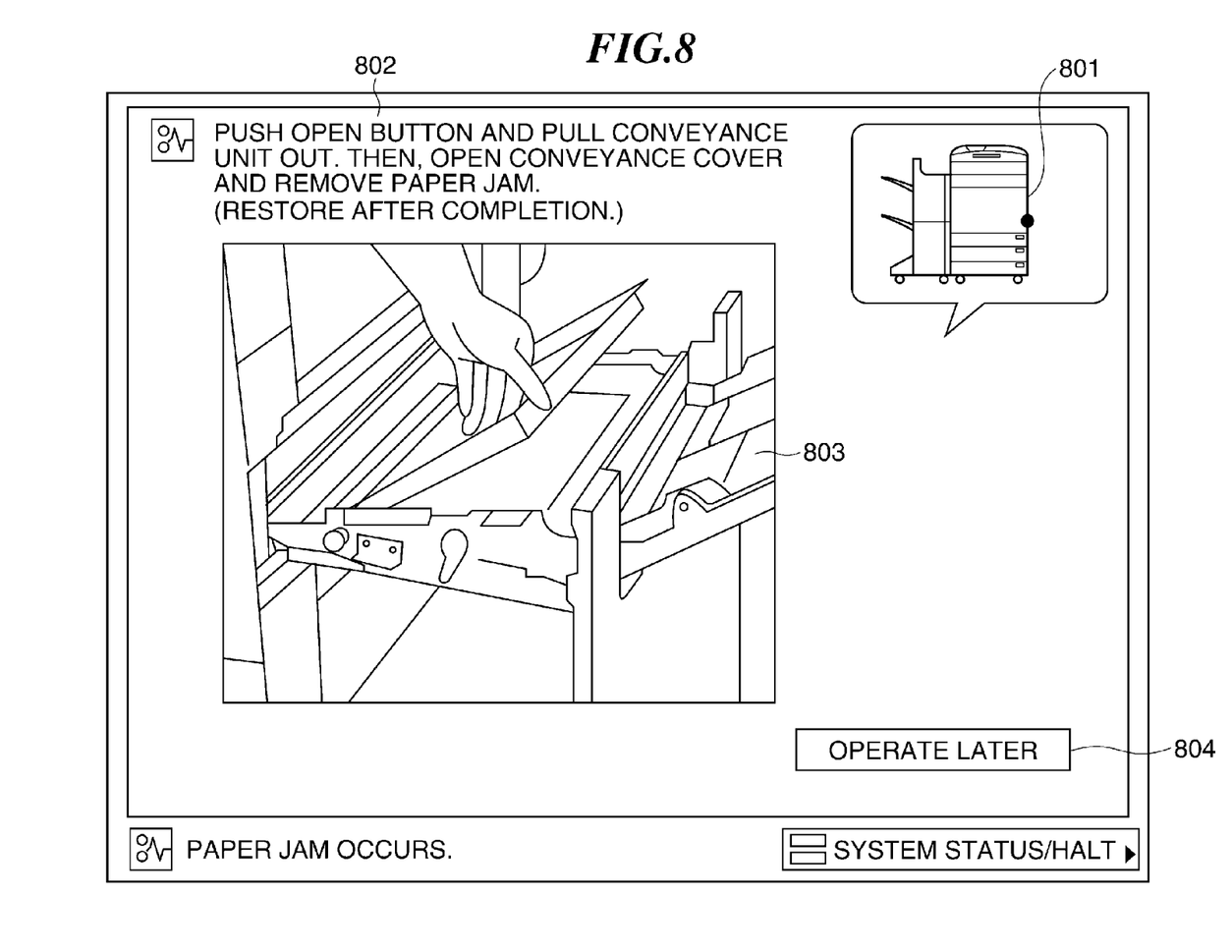
FIG. 8 is a view showing a screen example that shows operating procedure data displayed on the operation unit in the operation guidance display process in FIG. 6.

FIG. 8 is a view showing a screen example that shows the operating procedure data displayed on the operation unit 2012 in the operation guidance display process in FIG. 6.

In FIG. 8, a jam occurrence point display area 801 is an area in which an illustration that displays a jam occurrence position in the main unit is displayed. In FIG. 8, a circular mark is displayed on a right-side door section of the main unit to indicate that a jam occurs at that point.

A jam release instruction text area 802 is an area in which a text for describing the operation by the user for releasing the occurred jam is displayed.

A post-process key 804 is a key for closing this jam display screen, in order to perform operation settings of processes (a scan of an original, a facsimile transmission, etc.) that do not need the printer.

A jam video area 803 is an area in which a video of the user's operation for releasing the occurred jam is displayed.

When releasing a jam occurred in the image processing apparatus 200, a user must open a cover of the main unit of the image processing apparatus 200 and remove jamming paper by operating various levers and handles.

However, since the sequence of operations, such as handle operation and open-close of a cover, in the image processing apparatus 200 is established, it becomes difficult to remove paper when the sequence is disregarded or mistaken. Therefore, the video is used to display the sequence to remove paper. The images showing the movement data and the images showing the operating procedure data shown in FIG. 7A through FIG. 7D are displayed in the same screen.

Figure 9:
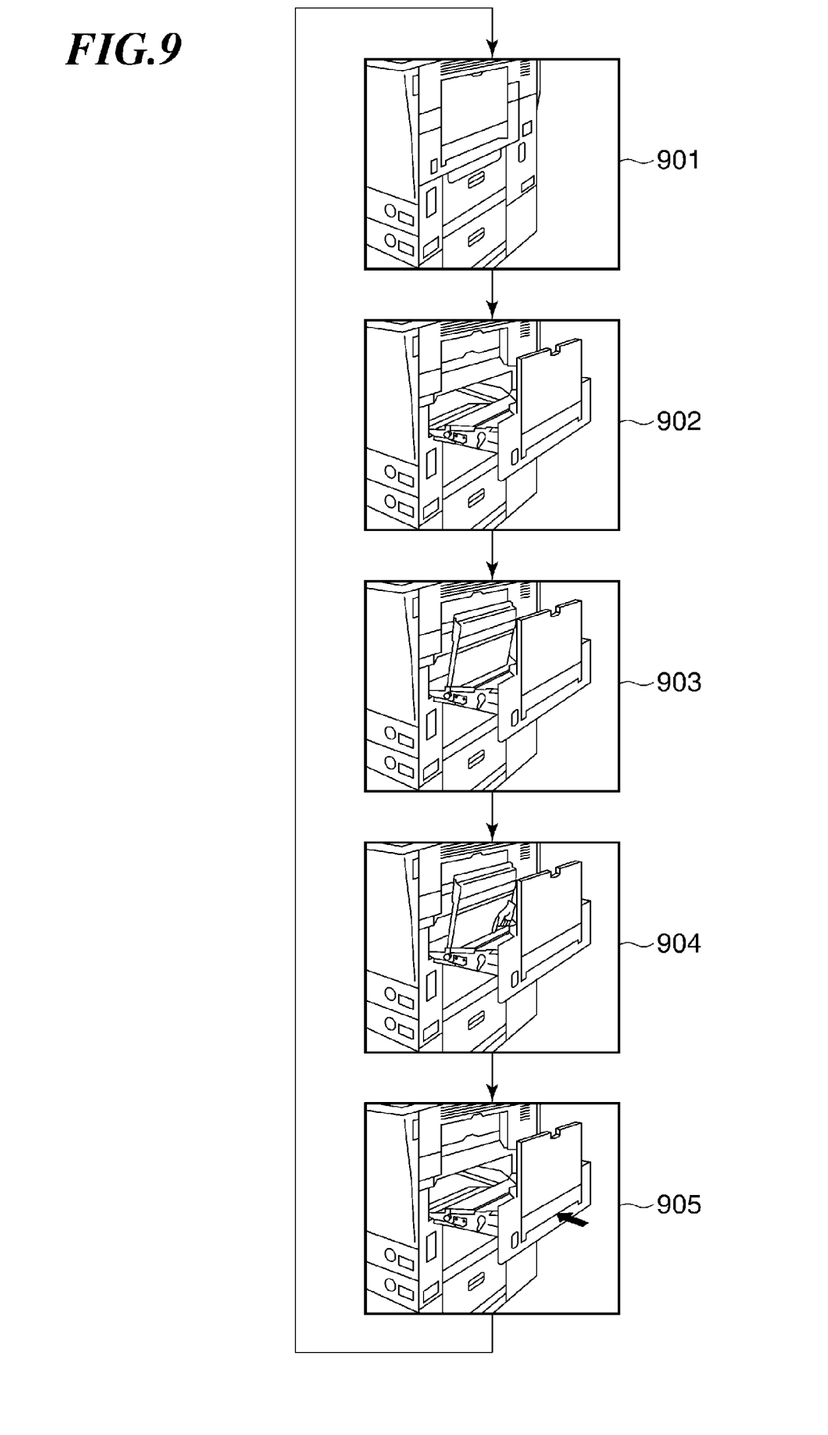
FIG. 9 is a view showing some images of video shown by the operating procedure data displayed on a video area in FIG. 8.

FIG. 9 is a view showing some images of the video shown by the operating procedure data displayed on the jam video area 803 in FIG. 8.

Images 901 through 905 shown in FIG. 9 show the operating procedure that the user should perform step by step from the state where the conveyance unit is in the regular position. The video is repeatedly displayed by displaying the image 901 after displaying the image 905.

Figure 10:
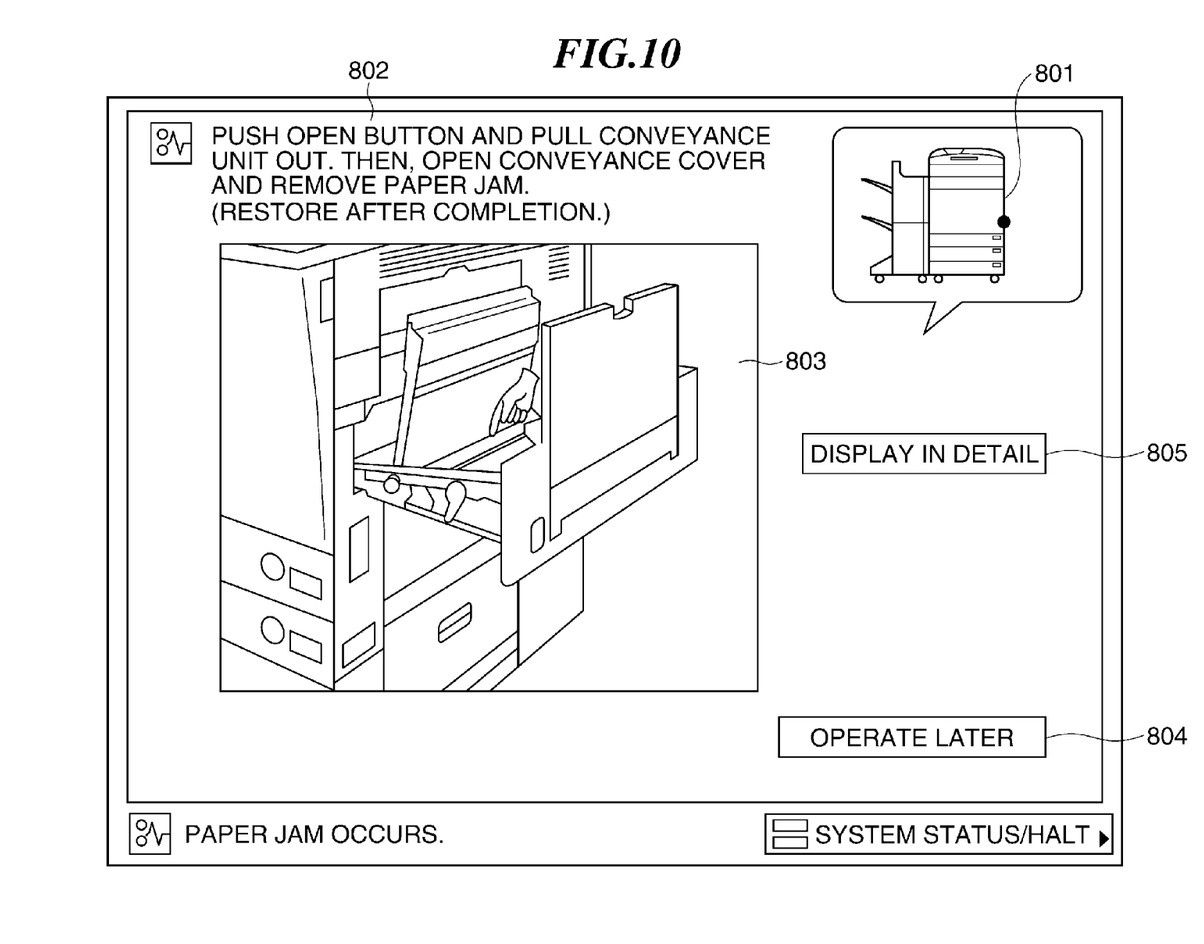
FIG. 10 is a view showing a screen displayed on the operation unit immediately after occurrence of jam in a main unit of the image processing apparatus shown in FIG. 1.

FIG. 10 shows a screen that is displayed on the operation unit immediately after a jam occurs in the main unit of the image processing apparatus 200. Video data displayed in the jam video area 803 shows a method for releasing a jam occurred at the right side of the main unit of the image processing apparatus 200, and is stored in a storage area (the HDD 2004 etc.) in the main unit. A button 805 is pushed by the user when displaying detailed information.

About ten types of video data are stored in the HDD 2004 for every jam occurrence point.

Although the above-mentioned embodiment described the solution at the time when a jam occurs in the image processing apparatus, the present invention is not limited to release a jam, but is applicable to any cases that a user needs to solve.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104366, filed on May 9, 2011, which is hereby incorporated by reference herein in its entirety.

What is claimed is:

1. An image processing apparatus comprising:
    a holding unit configured to hold a user position indicating a position of a user with respect to the image processing apparatus;
    a plurality of detection units configured to detect a plurality of errors that may occur in the image processing apparatus, respectively;
    an operating procedure data storing unit configured to store operating procedure data that shows user's operations required to release the respective errors, and operating positions at which the respective user's operations are performed;
    a movement data storing unit configured to store movement data that urges a user to move to an operating position from the user position;
    a first acquisition unit configured to acquire, when at least one of said detection units detects an error, operating procedure data and an operating position corresponding to the detected error from said operating procedure data storing unit;
    a second acquisition unit configured to acquire, when the user position held by said holding unit differs from the operating position acquired by said first acquisition unit, applicable movement data from said movement data storing unit; and
    a display unit configured to display, when said second acquisition unit acquires the movement data, the operating procedure data acquired by said first acquisition unit after displaying the movement data, and to display, when said second acquisition unit does not acquire the movement data, the operating procedure data acquired by said first acquisition unit.

2. The image processing apparatus according to claim 1, wherein said holding unit holds an operating position acquired by said first acquisition unit as said user position after an operation based on the operating procedure data.

3. The image processing apparatus according to claim 2, further comprising a determination unit configured to determine whether the user position held by said holding unit corresponds to the operating position acquired by said first acquisition unit, and wherein said display unit displays data based on a determination result by said determination unit.

4. The image processing apparatus according to claim 1, wherein said detection units are sensors that detect a jam position.

5. The image processing apparatus according to claim 1, wherein said display unit displays the movement data and the operating procedure data in a single screen.

6. A control method for an image processing apparatus comprising:

a holding step of holding a user position indicating a position of a user with respect to the image processing apparatus;

a detection step of detecting an error that may occur in the image processing apparatus;

a first acquisition step of acquiring operating procedure data that shows a user's operation required to release the error and an operating position at which the user's operation is performed from an operating procedure data storing unit when the error is detected in said detection step;

a second acquisition step of acquiring movement data that urges a user to move to an operating position from the user position from a movement data storing unit when the user position held in said holding step differs from the operating position acquired in said first acquisition step; and a display step of displaying, when the movement data is acquired in said second acquisition step, the operating procedure data acquired in said first acquisition step after displaying the movement data, and of displaying, when the movement data is not acquired in said second acquisition step, the operating procedure data acquired in said first acquisition step.

7. A non-transitory computer-readable storage medium storing a control program causing a computer to execute a control method for an information processing apparatus, the control method comprising:

a holding step of holding a user position indicating a position of a user with respect to the image processing apparatus;

a detection step of detecting an error that may occur in the image processing apparatus;

a first acquisition step of acquiring operating procedure data that shows a user's operation required to release the error and an operating position at which the user's operation is performed from an operating procedure data storing unit when the error is detected in said detection step;

a second acquisition step of acquiring movement data that urges a user to move to an operating position from the user position from a movement data storing unit when the user position held in said holding step differs from the operating position acquired in said first acquisition step; and a display step of displaying, when the movement data is acquired in said second acquisition step, the operating procedure data acquired in said first acquisition step after displaying the movement data, and of displaying, when the movement data is not acquired in said second acquisition step, the operating procedure data acquired in said first acquisition step.

* * * * *